United States Patent

Roebuck et al.

[11] Patent Number: 5,233,783
[45] Date of Patent: Aug. 10, 1993

[54] FISH HOOK AND LURE PROTECTOR

[76] Inventors: Terri L. Roebuck; Frederick M. Vogel, both of 38042 Terra Mar, Mt. Clemens, Mich. 48045

[21] Appl. No.: 736,038

[22] Filed: Jul. 25, 1991

[51] Int. Cl.$^5$ ............................................. A01K 97/06
[52] U.S. Cl. ..................................................... 43/25.2
[58] Field of Search ...................... 43/25.2, 54.1, 57.1

[56] References Cited

U.S. PATENT DOCUMENTS

| | | |
|---|---|---|
| 2,548,080 | 4/1951 | Thorn . |
| 2,707,583 | 5/1955 | Keilholz . |
| 2,729,913 | 1/1956 | Holwerda . |
| 2,782,553 | 2/1957 | Harris . |
| 2,849,825 | 9/1958 | Reisner ................. 43/25.2 |
| 2,878,610 | 3/1959 | Heistedt ................. 43/25.2 |
| 3,800,456 | 4/1974 | Rowe ..................... 43/25.2 |
| 4,015,361 | 4/1977 | O'Reilly ................ 43/25.2 |
| 4,049,165 | 9/1977 | Goldhaft . |
| 4,366,641 | 1/1983 | Price et al. . |
| 4,375,137 | 3/1983 | Chitwood . |
| 4,441,274 | 4/1984 | Masur ..................... 43/25.2 |
| 4,452,003 | 6/1984 | Deutsch ................. 43/25.2 |
| 4,884,357 | 12/1989 | Clifford ................ 43/25.2 |

Primary Examiner—Kurt C. Rowan
Attorney, Agent, or Firm—Basile and Hanlon

[57] ABSTRACT

A container for the storage and transportation of fishing hooks and lures. The container is a hollow body with the external shape of a fish, surrounding an internal chamber, with access through an opening in the bottom for access to the hooks or lures. The opening extends and includes the mouth end of the fish-like container, allowing the hooks or lures to be stored while still attached to the fishing line. The fish-shaped container also includes a generally circular shaped hook or loop in the caudal fin, to accommodate attachment of the container to fishing rod eyelets, or the fishing reel.

1 Claim, 1 Drawing Sheet

FISH HOOK AND LURE PROTECTOR

FIELD OF THE INVENTION

The present invention relates generally to containers for the safe storage and transportation of fishing hooks and lures, particularly while still attached to a fishing line and related fishing tackle, such as a rod and reel.

BACKGROUND OF THE INVENTION

One of the constant problems, and a principal safety and convenience consideration in storing, transporting, and using fishing tackle, including hooks and lures, has been associated with preventing the various types of barbed hooks from becoming entangled with other fishing tackle and/or presenting a painful safety hazard for those that come in contact with exposed hooks. One of the particular problems that has presented itself, is protecting the exposed fishing hooks, once they have been attached to a fishing line and a rod and reel, particularly when the fisherman desires to transport his rod and reel, with the necessary hooks or lures still attached to his fishing line.

Specifically, the prior art has addressed the problem of safely storing, transporting, and identifying unmounted fishing hooks and lures, but has not offered an appropriate solution to transporting hooks and lures while still attached to the fishing line on a rod and reel. For example, U.S. Pat. No. 2,729,913 discloses a test tube shaped container designed for the storage of fishing flies and hooks, particularly when being transported in the pocket of the fisherman. U.S. Pat. No. 3,832,798 discloses a generally cylindrically shaped container for the storage and transportation of fishing hooks and particularly fishing lures, that can fully enclose the lure and accompanying hooks, and at the same time provides a clasp or other device to secure the container to other objects, particularly the body of the fisherman. In similar fashion, U.S. Pat. No. 4,383,385 discloses a generally cylindrically shaped transparent tube, once again directed to the storage and transportation of hooks and lures, that can be readily attached to the fisherman's person. U.S. Pat. No. 2,707,583 is also directed to another variation of a closable cylindrical container, principally directed to the convenient and safe transportation of fishing hooks and lures, when not in use, and detached from the fishing line.

In contrast, U.S. Pat. No. 4,049,165 discloses a generally cylindrically shaped hook and lure storage container, contained as an integral part of a portable fishing rod and reel. Once again, this device discloses various chains and clasps for attaching this integral rod, reel and lure holder to other objects, such as the body of the fisherman. U.S. Pat. No. 4,366,641 again provides generally cylindrical, or hexagonally shaped cylinders for the storage of hooks and lures, with multiple cylinders being contained in a larger tote, or carrying device. U.S. Pat. No. 4,375,137 represents a slightly different approach to the problem of storing hooks and lures, by employing a flat plate with appropriately mounted spring clips, to hold and secure the exposed hooks and loops to the plate. U.S. Pat. No. 2,548,080 is directed to a bullet shaped lure container, suitable for attachment to the fisherman's belt. U.S. Pat. No. 2,782,553 likewise discloses an invention directed to the transportation of fishing hooks, and particularly fishing lures, on the person of the fisherman using an appropriately shaped belt, employing hook protecting recesses that leave the lure bodies exposed for selection by the fisherman.

None of the prior art devices provide a workable and convenient solution to transporting hooks and lures while still attached to the fisherman's fishing line. Other objects, features and advantages of the present invention over the prior art will be apparent to those skilled in the art after reading the following descriptions of the present invention.

SUMMARY OF THE INVENTION

The present invention is directed to a container for the storage and transportation of fish hooks and other types of hook-containing fishing tackle such as fishing lures. In its simplest form the invention includes a container fully, or partially, surrounding an internal chamber, or cavity, an arrangement for closing the cavity or otherwise securing the hooks within the cavity, and an arrangement to allow the hooks and/or lures to be inserted, stored, transported and removed from the container while still attached to a fishing line or leader. The container may be contracted in such a fashion to accommodate its attachment to other articles.

The present invention may include a fish-shaped puncture resistant container of various potential sizes, corresponding to the size of the hooks or lures it will be expected to contain. In one embodiment, it includes a means for maintaining the hooks or lures within the internal chamber of the device, by sufficiently closing the internal chamber to prevent escape of the hooks or lures. It should be apparent that a suitable attaching point within the internal chamber of the device could be provided, to accommodate the attachment of hooks. Furthermore, the container includes an aperture of sufficient size to accommodate a fishing line. The fishing line aperture is contiguous or integral with the opening in the internal chamber of the device for inserting and removing the lures. In this fashion, the lure can be secured within the device while still attached to the fishing line. The container can, simultaneously or independently, be attached to other objects, such as the eyelet of the fishing rod, or the bail of the fishing reel or other convenient location while enclosing a lure or hooks attached to a fishing line.

The invention thus allows a fishing hook or lure to be transported safely while still attached to a fishing line, and at the same time allows the line to be tensioned for convenient transport, without exposing the hooks.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWING

The description herein makes reference to the accompanying drawings wherein like reference numerals refer to like parts throughout the several views, and wherein.

DESCRIPTION OF THE PREFERRED EMBODIMENT

Figure 2:
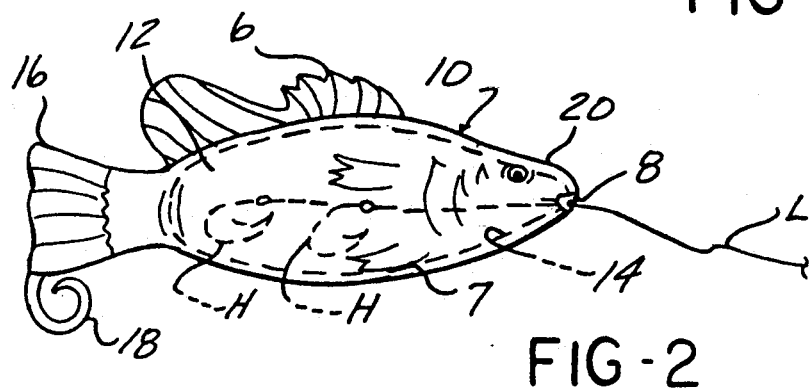
FIG. 2 is a side view, depicting in hidden lines hooks stored within an internal chamber of the container.
Figure 3:
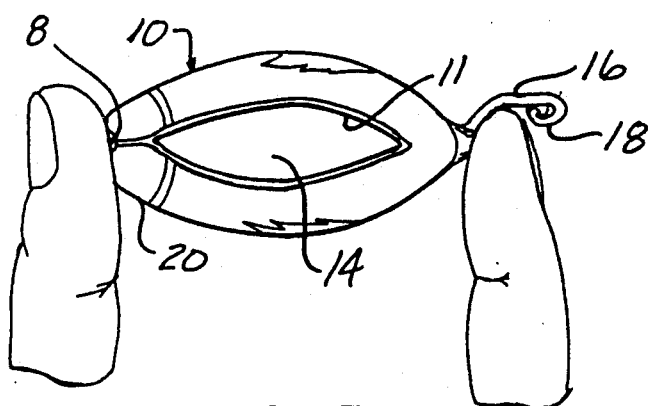
FIG. 3 is a bottom view, showing the bottom opening being actuated by squeezing.

The invention includes a hollow body member, which in the preferred embodiment of the invention has a generally elongated, flexible fish-shaped container 10 which is generally elliptical in cross-section, with an exterior surface 12. The exterior surface 12 may be shaped and colored to closely resemble a fish to varying degrees as desired. In the preferred embodiment, the device is constructed of a plastic or other rubber-like material, which is resiliently flexible. The hollow body member contains an internal chamber 14, intended to provide a protected internal storage location for fish hooks H, or other fish hook containing fishing lures. A slit-like opening 11, extending from a small round aperture 8, located adjacent a simulated mouth location of the fish, extends longitudinally back along the bottom, or belly of the simulated fish, a sufficient length to allow placement and removal of the largest lure that the container 10 is intended to accommodate. In the preferred embodiment of the invention the slit 11 in the bottom of the resilient container 10 can be opened and closed by squeezing the container 10 between the finger or palms depending on size, as illustrated in FIG. 3, much in the fashion of the common flexible plastic change holder. The internal surfaces of the hollow body member itself, which define the internal chamber 14, retain the enclosed hooks H when the slit 11, which forms an openable passage, is in the closed position. By having the slit-like opening 11 of the container 10 extend all the way to the aperture 8 in the simulated mouth of the fish, the fish hooks or lures may be inserted and stored in the internal chamber of the device 14 while still attached to a fishing line L. The fishing line L can extend from the internal chamber 14 of the container 10 through the aperture 8 in the mouth which forms a conduit to the exterior of the container 10 as illustrated in FIG. 2.

The container 10 can be conveniently attached to other objects, such as the eyelets of a fishing rod or the bail of a fishing reel. The tail 16 portion of the container 10 may include an integral closed hook or loop 18 to accommodate attachment to these other objects. This allows the container 10 itself to be attached to other objects, such as the fishing pole, and then allows the line to remain attached to the enclosed hooks or lures, and be appropriately tensioned to prevent tangling. In the preferred embodiment, the container 10 is constructed of a resilient material and the line accommodating aperture is sufficiently small, so that no separate or independent hook engaging means is necessary in the internal chamber. In addition, the slit-like opening 11 is self-closing in the preferred embodiment of the simulated fish. In other words, the container 10 is preferably constructed of resilient material with sufficient elasticity to return to its original shape after being squeezed.

Figure 1:
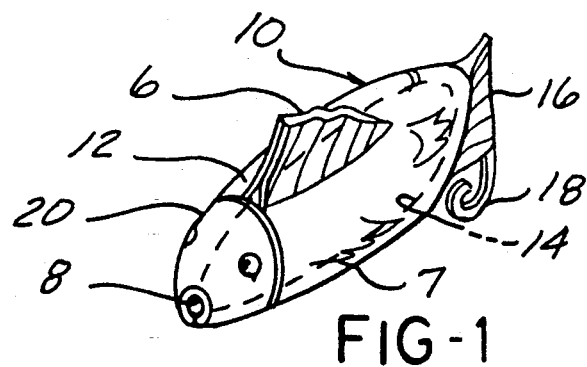
FIG. 1 is a perspective view of a container made in accordance with this invention, showing the preferred embodiment depicting the fish-like external appearance.

Specifically identifying the features of the drawings, FIG. 1 is a perspective view, depicting the general exterior with simulated fish-like exterior appearance and contour of the container in the preferred embodiment. It shows the head 20, the substantially flat generally triangularly shaped tail or caudal fin 16, including the integrally formed closed hook or loop-like structure 18 providing a means for attaching the container 10 to other objects, the dorsal fin 6, and the pectoral fin 7.

FIG. 1 also shows the small line accommodating aperture 8 in the normal location of the fish's mouth, as well as the fishing line L shown passing through the aperture 8 which forms a conduit into the internal chamber 14 of the container 10.

FIG. 2 shows in hidden line the internal chamber 14, and the slit 11 in the bottom of the fish-like container 10. The slit 11 can be opened for insertion or removal of the fishing lures or hooks H. The aperture 8 in the mouth location of the simulated fish accommodates the passage of fishing line L leading to the lure or hook H.

FIG. 3 shows the fish being squeezed in a longitudinal direction to open the slit 11 in the bottom of the fish for insertion of the lures having hooks H in the internal chamber 14. It also shows the slit 11 extending all the way to the mouth aperture 8 formed in the container 10, and demonstrates how the lures can be inserted into and removed from the container 10 while still attached to the fishing line L.

Figure 4:
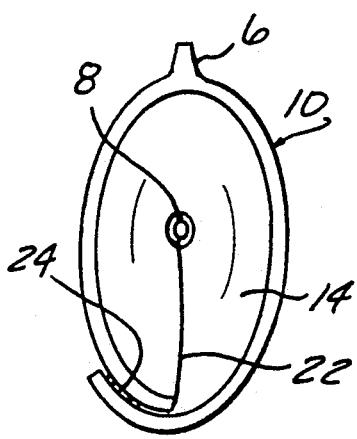
FIG. 4 is a cross sectional view depicting an alternate embodiment employing a snap-type closure.

FIG. 4 illustrates an alternative embodiment for closure of the opening 22 in the fish providing access to the internal chamber, by way of a mating male and female snap fastener 24. This type of closure is generally more suitable when the material employed to construct the container is either too stiff, or too flexible and elastic, to accommodate the type of closure in the preferred embodiment.

Figure 5:
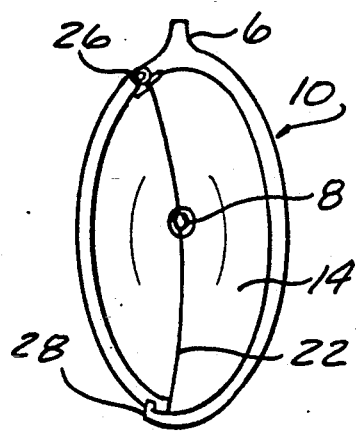
FIG. 5 is a cross sectional view showing an alternate embodiment employing a hinged snap-over type closure.

FIG. 5 discloses a fastening means employing a hinge 26 and a snap-over type clasp 28 to securely close the container. The clasp is formed by a rib and corresponding groove in the opposing halves of the hollow body member which has been divided along a generally longitudinal plane. This embodiment is particularly suited to containers made of a stiffer material, such as the harder plastics.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A fishing tackle container for enclosing and protecting fish hooks and fish hook containing fishing lures capable of attachment to one of a group of fishing implements including a fishing rod, reel and pole, the fishing implement having fishing line attached thereto at one end and attached to said fish hooks and fish hook containing lures at the other end, the container comprising:

a flexible hollow body member of puncture resistant material having an exterior surface structured to closely resemble a fish in shape, texture and color including a head with a simulated mouth, surrounding a small aperture which extends into an internal chamber within said body member, a dorsal fin and a tail fin, the body member defining an internal chamber generally shaped to approximate an internal body cavity of an actual fish, the internal chamber being accessible through a slit-like opening into the internal chamber of the body member and extending from the aperture in the simulated mouth opening along substantially an entire longitudinal length of the body member from head to tail;

hook retention means for maintaining said fish hooks within the internal chamber, wherein said body member is constructed with sufficient flexibility to allow said body member to be squeezed by applying external pressure in a longitudinal direction such that said slit-like opening will open sufficiently to allow insertion and removal of said hooks and lures, while said body member has sufficient elasticity to adequately close said slit to retain any enclosed fish hooks when external pressure is removed;

attachment means for detachably connecting the hollow body member to other objects, the attachment means including a substantially flat, generally triangularly shaped tail fin with an integral open loop-shaped hook formed in the lower section of said tail fin; and conduit means for allowing passage of at least one fishing line from the internal chamber to an exterior of said hollow body member, the conduit means including a relatively small aperture located in said simulated mouth of said hollow body member contiguous with said slit like opening allowing said internal chamber to be opened and closed to allow said hooks and lures to be inserted and removed from said internal chamber while said hooks and lures remain connected to said fishing line.

* * * * *